United States Patent
Verma et al.

(10) Patent No.: US 11,188,351 B2
(45) Date of Patent: Nov. 30, 2021

(54) PERSONAL ADVISOR FOR MANAGING PRIVATE INFORMATION

(71) Applicant: International Business Machines Corporation, Armonk, NY (US)

(72) Inventors: Dinesh C. Verma, New Castle, NY (US); Bong Jun Ko, Harrington Park, NJ (US); Wei-Han Lee, White Plains, NY (US); Seraphin Bernard Calo, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 16/543,219

(22) Filed: Aug. 16, 2019

(65) Prior Publication Data
US 2021/0049020 A1  Feb. 18, 2021

(51) Int. Cl.
*G06F 9/445* (2018.01)
*H04L 29/06* (2006.01)
*G06F 21/62* (2013.01)

(52) U.S. Cl.
CPC ........ *G06F 9/4451* (2013.01); *G06F 21/6245* (2013.01); *H04L 63/0245* (2013.01); *H04L 63/0263* (2013.01); *H04L 63/102* (2013.01)

(58) Field of Classification Search
CPC . G06F 9/4451; G06F 21/6245; H04L 63/102; H04L 63/0245; H04L 63/0263
USPC .......................................................... 726/26
See application file for complete search history.

(56) References Cited

U.S. PATENT DOCUMENTS

| | | | |
|---|---|---|---|
| 7,321,769 B2* | 1/2008 | Bhide | H04W 4/18 370/349 |
| 7,647,387 B2* | 1/2010 | Bellare | G06Q 30/02 709/218 |
| 9,280,682 B2 | 3/2016 | Hayato et al. | |
| 9,325,582 B2* | 4/2016 | Agrawal | H04L 41/5051 |
| 9,928,381 B2* | 3/2018 | Vidhani | G06F 21/6245 |
| 2013/0145010 A1* | 6/2013 | Luna | H04L 47/70 709/223 |
| 2016/0180216 A1* | 6/2016 | Allen | G09B 7/02 706/46 |
| 2018/0004932 A1* | 1/2018 | Gray | G06F 21/45 |

(Continued)

OTHER PUBLICATIONS

Pearl Pu and Boi Fallings, "Personalized navigation of heterogeneous product spaces using Smartclient," Proceeding: of the 7th international conference on Intelligent user interfaces (IUI '02). ACM, New York, NY, USA, 212-213. (Year: 2002).*

(Continued)

*Primary Examiner* — Maung T Lwin
*Assistant Examiner* — Sanchit K Sarker
(74) *Attorney, Agent, or Firm* — Patterson + Sheridan, LLP

(57) ABSTRACT

Regulating a flow of data from an electronic device comprises generating a user profile associated with a user. Further, a resource profile is generated and is associated with one or more resources external to the electronic device. Additionally, a context profile is generated and describes an outcome of one or more previous interactions between the user of the electronic device and one or more resources. Rules are generated based on a comparison the user profile, the context profile and the site profile. Further, data sent from an electronic device is modified based on the set of rules.

18 Claims, 5 Drawing Sheets

(56) References Cited

U.S. PATENT DOCUMENTS

2019/0378374 A1* 12/2019 Sawyer ................. G06F 16/35
2021/0049020 A1*  2/2021 Verma .................. G06F 9/4451

OTHER PUBLICATIONS

Pearl Pu and Boi Faltings, "Personalized navigation of heterogeneous product spaces using Smartclient," Proceedings of the 7th international conference on Intelligent user interfaces (IUI '02). ACM, New York, NY, USA, 212-213.

Max Van Kleek, Brennan Moore, David R. Karger, Paul André, and M.C. Schraefel, "Atomate it! end-user context-sensitive automation using heterogeneous information sources on the web," Proceedings of the 19th international conference on World wide web (WWW '10). ACM, New York, NY, USA, 951-960.

* cited by examiner

PERSONAL ADVISOR FOR MANAGING PRIVATE INFORMATION

BACKGROUND

Maintaining control over the privacy of a user's data has proven to be difficult. For example, while interacting with various websites, the amount of a user data requested by the websites is commonly beyond the ability of a user to track. As such, users are typically unable to control what information and when information is shared with a website. In some instances, software has been employed to aid with controlling user data. However, current methods for controlling the sharing of user information heavily rely on a user's involvement, and thus, are burdensome for the user. As such, users commonly elect not to use such software, choosing to allow the user's personal data to be uncontrolled. Thus, there is a need for an improved data control system that maintains the privacy of a user's data without requiring significant input from the user.

SUMMARY

According to one embodiment of the present invention, a method for regulating a flow of data from an electronic device comprises generating a user profile associated with a user. The method further comprises generating a resource profile associated with one or more resources external to the electronic device, and generating a context profile describing an outcome of one or more previous interactions between the user of the electronic device and one or more of the plurality of resources. Further, the method comprises generating set of rules based on a comparison of the user profile, the resource profile, and the context profile, and modifying outgoing data being sent to a first one of plurality of the resources from the electronic device based on the set of rules. Each rule of the set of rules defines at least one of when and what type of data of the user profile is shared with each of the plurality of resources.

According to one embodiment of the present invention, an electronic device comprises an advisor. The advisor comprises user profile manager, a resource profile manager, a context profile manager, and a rule manager. The user profile manager is configured to generate a user profile associated with a user. The resource profile manager is configured to generate a resource profile associated with one or more resources external to the electronic device. The context profile manager is configured to generate a context profile describing an outcome of one or more previous interactions between the user of the electronic device and one or more resources. The rule manager is configured to generate a set of rules based on a comparison of the user profile, the context profile and the resource profile. Further, the advisor is configured to modify outgoing data from the electronic device based on the set of rules. Each rule of the set of rules defines at least one of when and what type of data of the user profile is shared with each of the plurality of resources.

According to one embodiment of the present invention, a computer program product for controller user data comprises a computer-readable storage medium having computer-readable program code embodied therewith. The computer-readable program code is executable by one or more computer processors to generate a user profile comprising data associated with a user, and generate a resource profile associated with one or more resources external to the electronic device. Further, the computer-readable program code is executable to generate a context profile describing an outcome of one or more previous interactions between the user of the electronic device and one or more resources, generate a set of rules based on a comparison of the user profile, the context profile and the site profile, and modify outgoing data being sent to one of the one or more resources based on the set of rules. Each rule of the set of rules defines at least one of when and what type of data of the user profile is shared with each of the plurality of resources.

DETAILED DESCRIPTION

Embodiments herein describe regulating data provided by a user from an electronic device. In one embodiment, the electronic device includes an advisor (e.g., a software application) that regulates data communicated from the electronic device to a resource remote from the electronic device. A remote electronic device may include one or more of a website, a file server, a cloud hosted service, an email server, an ecommerce site, and an online banking site, among others. In one embodiment, the advisor includes rules (e.g., policies) which may be used to govern data that is sent to a remote resource. In various embodiments, the advisor controls the data communicated to a remote resource, limiting or granting access to portions of the data based on the rules without user intervention. Accordingly, the advisor improves user experience by mitigating the amount of input provided by the user regarding which data is to be shared with which remote resource.

Figure 1:
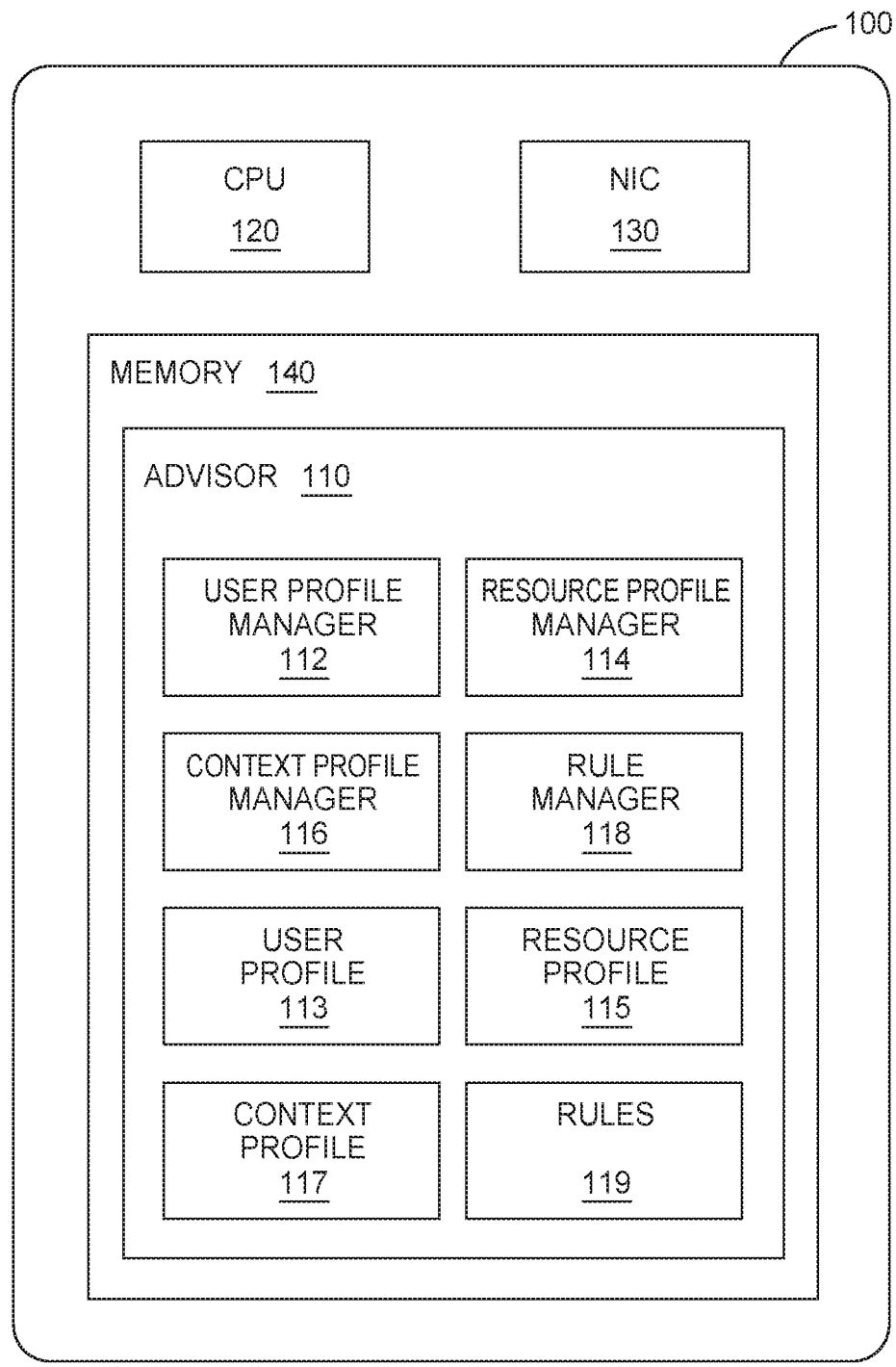
FIG. 1 illustrates a block diagram of an electronic device, according to one more embodiments.

With reference now to FIG. 1, an electronic device 100 includes an advisor 110. In various embodiments, the electronic device 100 further includes one or more of a processor 120, a network interface controller (NIC) 130, and a memory 140. The electronic device 100 may be a mobile telephone, a laptop, a tablet, a desktop, or a wearable computing device (e.g., smartwatch, fitness tracker, etch), among others.

The memory 140 generally includes program code for performing various functions related to operating the electronic device 100. The program code is generally described as various functional "applications" or "modules" within the memory 140, although alternate implementations may have different functions or combinations of functions. The memory 140 also generally includes data structures that may store information for use by the various program code modules also stored thereon. For example, the memory 140 includes program code for an advisor 110 and data structures for user profile 113, resource profile 115, context profile 117, and rules 119. Further, other applications and data structures may also be included by the memory 140.

The advisor 110 may control data communicated from the electronic device 100. For example, the advisor 110 may modify the data being sent from the electronic device 100, adding and/or removing data packets from the data.

As shown, the advisor 110 includes a user profile manager 112, a resource profile manager 114, a context profile manager 116, and a rule manager 118. The user profile manager 112 builds a user profile 113 comprising data associated with a user of the electronic device 100. For example, the data may be based on attributes associated with the user. In one embodiment, the attributes may include one or more of a birthdate, a relationship with others, associations with groups (e.g., employers, memberships, social networks, trade associations, companies, services, etc.). In one embodiment, the user profile data of a user may be a graph that captures the known relationships of different humans, with one user indicated as being the owner of the data.

In one embodiment, the user profile manager 112 builds the user profile 113 without explicit user input. For example, the user profile manager 112 may build the user profile from data stored within the electronic device 100 (e.g., data stored within the memory 140). Additionally, or alternatively, the user profile manager 112 may build the user profile 113 based on data associated within one or more applications running on the electronic device 100. Further, the user profile manager 112 may build the user profile 113 based on data associated with one or more websites visited by a user. The user profile 113 may be built using algorithms that utilize entries in a contact list associated with the user, dates scheduled into a calendar associated with the user, and the volume of data exchanged on specific dates by the user, among others. In one embodiment, the user profile 113 may define birth dates of relatives and/or friends of the user, age of the user, employer of the user, the preferred language of the user, and/or other similar attributes.

The resource profile manager 114 builds a resource profile 115 including data corresponding to one or more attributes of one or more resources. The resources are remote from the electronic device 100. For example, the resources may be a website, an application running on a server (e.g., cloud computing applications), and the like. Applications running on a server may include communication applications, monitoring applications, finance applications, content delivery applications, and storage applications, among others. In one or more embodiments, the data of the resource profile 115 includes a category characterization, an owner of the resource, location of the resource, risk rating of the resource, hosting company, and whether or not the user of the electronic device 100 has an account with a selected resource, among others. In one embodiment, the category characterization includes a commerce category, a trade category, a company category, and an association category, among others. Further, the location of the resource may correspond to a country in which the resource is hosted, or the location of the owner of the resource, among others.

In one embodiment, the resource profile manager 114 builds a resource profile for each resource. Further, the resource profile manager 114 may build a resource profile (e.g., the resource profile 115) by running classification algorithms on a resource, analyzing the contents of a resource, or requesting data associated with a resource from a service, among others. In one embodiment, a monitoring service provides information related to a categorization of a resource, location of a resource, and ownership of a resource, among others In one or more embodiments, running classification algorithms on a resource may include running a classification algorithm on a main page, or any other page, of a website to determine the class of the resource (e.g. a banking site, a social media site, an e-commerce site, and a search engine, among others). Further, analyzing the contents of a resource may include analyzing the main page of a website. Requesting data associated with a resource may include requesting data from a search engine. In one embodiment, the data associated with a resource may include one or more different types of discount codes available for the resource. In some embodiments, the resource profile manager 114 may request that the user review and/or modify the created resource profiles.

The context profile manager 116 builds a context profile 117 that associates data within a user profile (e.g., the user profile 113) with data of a resource profile (e.g., the resource profile 115). In one embodiment, the context profile 117 comprises data associated with when and/or where a user would like to provide data within the user profile 113 to a resource or a category of resource. For example, the context profile 117 may include data corresponding to an association between data of a user profile (e.g., the user profile 113), data of a resource profile (e.g., the resource profile 115), and an event. An event may correspond to whether or not a data from a user profile was shared with a resource. Further, the context profile 117 may include information regarding one or more user preferences. For example, the information regarding one or more user preferences may include whether a user prefers one type of resource over another for a particular task (e.g., commerce, banking, trading, etc.), a user prefers one payment method over another for a particular resource (e.g., a preferred credit card, a preferred payment service, etc.), whether or not a user releases one or more types of information (e.g. an email address, social media identifier, age, birthday, or the like), a time period over which a user prefers to receive reminders regarding different events, and/or a time period or user location during when the user does not or does want to share select data, among others.

The context profile 117 may associate data from a user profile (e.g., the user profile 113) with a resource and/or with a resource category. For example, the context profile 117 may associate data from the user profile 113 with a specific website. Further, the context profile 117 may associate data from the user profile 113 with a resource category (e.g., e-commerce website, a social network, a banking website, or a news website, among others).

In one embodiment, the context profile manager 116 builds the context profile 117 automatically, without explicit user input. For example, the context profile manager 116 builds the context profile 117 by observing a user's interactions with various resources. In one embodiment, the context profile manager 116 analyzes data being sent from the electronic device 100 to various resources, and in response to the analyzed data, builds the context profile 117. For example, in one embodiment, the context profile manager 116 analyzes data being sent from the electronic device 100 to an e-commerce resource and data being sent to a banking resource to determine that the user shares a first type of data with a commerce resource and a second type of data with a banking resource. The first type of data may include one or more of a payment method, and a membership in an organization. The second type of data may include one or more of a social network membership, and location of the user. In other embodiments, the first and second types of data may include other data types. In some embodiments, the context profile manager 116 requests the user to review and/or modify the context profiles.

In one embodiment, user preferences used to build the context profile 117 may be created by determining the frequency of which resources are visited or utilized by a user. Further, the context profile manager 116 may also include a preference to receive the lowest cost for a good or service, preference as to when receive an order, and preferences regarding the purchase of goods or services (e.g., proximate holidays, birthdays, anniversaries. etc.). For example, the context profile manager 116 may include a preference that a user prefers to make a gift purchase one or more days before a holiday or an anniversary event.

In one embodiment, the context profile manager 116 presents one or more questions to a user to build the context profile 117. For example, the context profile manager 116 may determine data that the context profile 117 lacks for a user and presents a question to the user corresponding to the data lacking from the context profile 117.

In one embodiment, the context profile manager 116 updates the context profile 117 based on observations of user's interactions with various resources. The context profile manager 116 may analyze each interaction with a resource, or analyze each interaction with a resource over a period of time.

The rule manager 118 generates rules (or policies) 119 based on the user profile 113, the resource profile 115, and the context profile 117. The rules 119 may govern which data is provided to which resource and/or when data is to be provided to each resource. Further, the rules 119 may govern which data and/or when data is provided to a type of resource. Each of the rules 119 may associate data or a data type, a resource or resource type, and a data release preference of a user. In one embodiment, the rules 119 are generated automatically, without user intervention. Further, the rules 119 may be updated continuously or periodically.

In one embodiment, the rule manager 118 utilizes a machine learning algorithm to generate the rules 119 from the user profile 113, the resource profile 115, and the context profile 117. The machine learning algorithm may be any algorithm that compares the user attributes stored within the user profile 113 with the resource attributes stored within the resource profile 115 and the context of whether or not user data was shared from the context profile 117 to generate the rules 119. In one embodiment, the machine learning algorithm is a data mining algorithm that compares the data of the user profile 113, the resource profile 115, and the context profile 117 to generate the rules 119. In one embodiment, the machine learning algorithm is a neural network that functions as a prediction system to generate the rules 119. Alternatively, the machine learning algorithm may be a clustering algorithm. A clustering algorithm can be executed on lower power processors as compared to other machine learning algorithms. For example, a cluster algorithm can execute on the processor (e.g., the processor 120) of a mobile phone or tablet device which can be lower powered or slower processors.

In one embodiment, the rules 119 may allow a first type of data to be shared with a resource, or a resource type. For example, a rule of the rules 119 may allow membership information for a user to be shared with an e-commerce website. Further, a rule may prevent data to be shared with a resource or a resource type. For example, a rule may prevent sharing of data corresponding to a user's current location or social network membership with an e-commerce or banking website.

In one or more embodiments, one or more of the profiles (e.g., the resource profile 115, and the context profile 117) and the rules (e.g., the rules 119) associated with a first user is bootstrapped with data associated with a second user having one or more similar attributes as the first user. For example, the advisor 110 may generate one or more rules associated with the first user based on one or more rules associated with the second user. Further, the advisor 110 may load portions or all of a resource profile (e.g., the resource profile 115) and/or portions or all of a context profile 117 associated with the second user into corresponding profiles associated with the first user. In one embodiment, identifying a user that has a similar attribute associated with another user comprises identifying users that are in a common age bracket, have a common employer, have a common social network membership, have a family relationship, and are located at a common address, among others.

The processor 120 may be any general processing device. For example, the processor 120 may be a central processing unit (CPU) of the electronic device 100. Further, in one embodiment, the processor may be an application specific integrated circuit (ASIC).

The NIC 130 communicates data to and from the electronic device 100. The NIC 130 may be a wireless NIC or a wired NIC. Further, the NIC 130 may communicatively couple the electronic device 100 with a wireless network or wired network. The NIC 130 may be communicatively coupled to the processor 120, such that the processor 120 may provide control signals to the NIC 130. In one embodiment, the NIC 130 is communicatively coupled with the advisor 110. For example, the advisor 110 may receive the data passing through the NIC 130 such that the data may be analyzed and/or modified based on the rules 119.

The memory 140 may be any type of storage device. For example, the memory 140 may be a non-volatile memory (NVM) device, or random access memory (RAM) device, among others. In one embodiment, the memory 140 includes one or more storage devices. For example, the memory 140 may include one or more NVM devices. Further, the memory 140 may include a NVM device and a RAM device. The memory 140 is communicatively coupled with the processor 120. In one embodiment, the memory 140 is communicatively coupled to the advisor 110. For example, the memory 140 may be communicatively coupled to the user profile manager 112, the resource profile manager 114, the context profile manager 116, and the rules manager 118. Further, the memory 140 may store one or more of the user profile 113, the resource profile 115, the context profile 117, and the rules 119.

Figure 2:
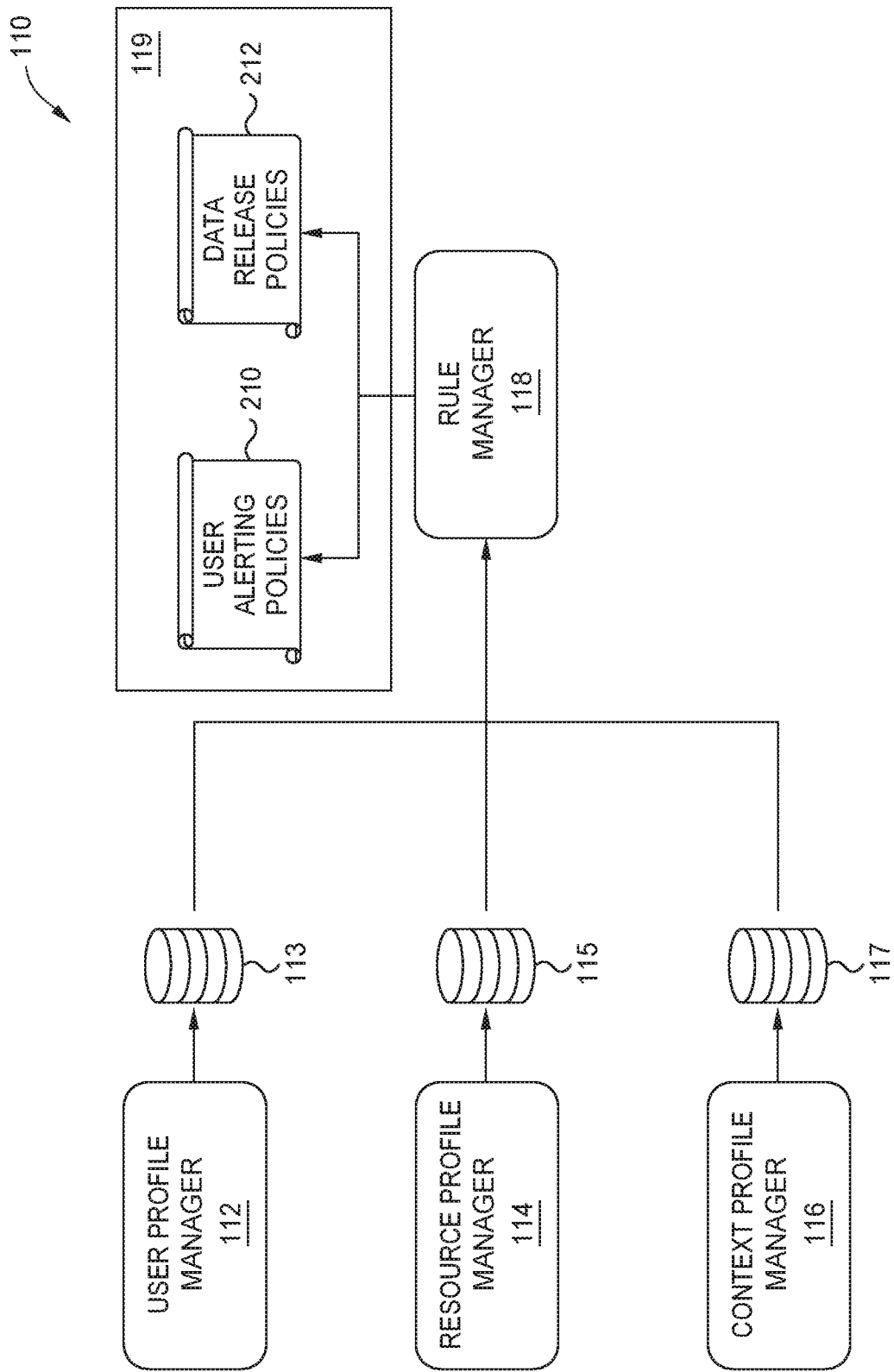
FIG. 2 illustrates a block diagram of an advisor, according to one or more embodiments.

FIG. 2 illustrates the advisor 110. As illustrated in FIG. 2, the rule manager 118 is communicatively coupled with the user profile manager 112, the resource profile manager 114, and the context profile manager 116. For example, the rule manager 118 is configured to access the user profile 113 generated by the user profile manager 112, the resource profile 115 generated by the resource profile manager 114, and the context profile 117 from the context profile manager 116. In one embodiment, the rule manager 118 generates the rules 119 from the user profile 113, the resource profile 115 and the context profile 117. In one embodiment, the rules 119 include user alerting policies 210 and data release policies 212.

The user alerting policies 210 comprise rules corresponding to when a user is to be alerted that data or a data type has been requested by a resource or a resource type. The data release policies 212 correspond to what data or data type and/or when data or a type of data is to be provided to a resource or a resource type.

Figure 3:
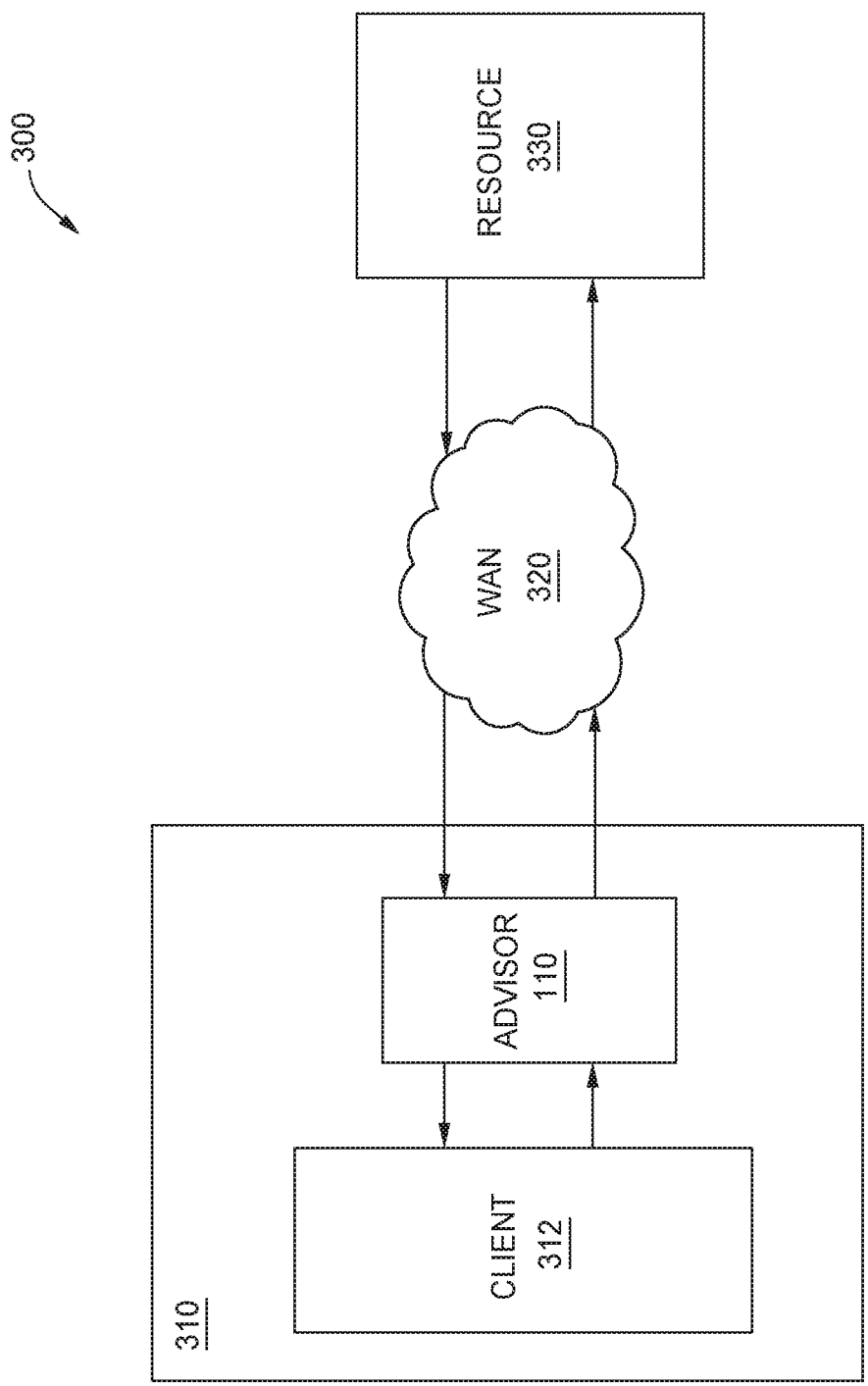
FIG. 3 illustrates a block diagram of a network, according to one or more embodiments.

FIG. 3 illustrates network 300 comprising an electronic device 310, a wireless area network (WAN) 320, and a resource 330. The electronic device 310 is configured similar to that of the electronic device 100. For example, the electronic device 310 includes the advisor 110. Further, while not shown, the electronic device 310 includes the processor 120, the NIC 130, and the memory 140. Further, the electronic device 310 includes a client 312. The client 312 communicates with the resource 330 via the WAN 320. The client 312 may be an application running locally on the electronic device 310. For example, the client 312 may be a web browser or an application running on the electronic device 310 (e.g., a banking application, a social network application, or a commerce application, among others).

In one embodiment, the client 312 communicates with the resource 330 via the WAN 320. For example, a NIC (e.g., the NIC 130) of the electronic device 310 may form a wireless connection with the resource 330 via the WAN 320. Further, the client 312 may communicate data to and receive data from the resource 330 via the connection formed with the WAN 320. The data sent from the client 312 to the resource 330 and sent from the resource 330 to the client 312 may be in the form of data packets.

The resource 330 is remote from the electronic device 310. For example, the resource 330 may be located within one or more servers remote from the electronic device 310. In one embodiment, the resource 330 is a website. In various embodiments, the resource 333 may be a collection of related network web resources, e.g., web pages and multimedia content, etc., located on one or more servers.

In one embodiment, the advisor 110 analyses the data transmitted from the client 312 to the resource 330. For example, the advisor 110 may analyze the data packets being sent to and from the client 312. Further, the advisor 110 may modify the data packets based on the rules 119. In one or more embodiments, the advisor 110 removes one or more data packets from the data packets being sent to the resource 330 based on the rules 119. For example, the advisor 110 may remove a data packet containing information that the rules 119 defined as not sharable with the resource 330 or a resource type corresponding to the resource 330. In various embodiments, the advisor 110 adds one or more data packets to the data being sent to the resource 330 based on the rules 119. For example, the advisor 110 may add a data packet containing information that the rules 119 define as being sharable with the resource 330 or a resource type corresponding to the resource 330.

In one embodiment, the advisor 110 may analyze at least a portion of the data being sent to and from the electronic device 310. In other embodiments, the advisor 110 may analyze data being sent from select clients running on the electronic device 310. Further, the advisor 110 may analyze data before it is received by the client 312. For example, the advisor 110 may analyze data as it received from the NIC (e.g., the NIC 130) of the electronic device 310. In one or more embodiments, the client 312 may provide the data to the advisor 110 after receiving the data from the NIC (e.g., the NIC 130) of the electronic device 310 and before data is sent to the NIC to be transmitted from the electronic device 310. In such an embodiment, the advisor 110 may communicate with the NIC of the electronic device 310, or the advisor 110 may be able to send data directly to the NIC while receiving data from the client 312.

Figure 4:
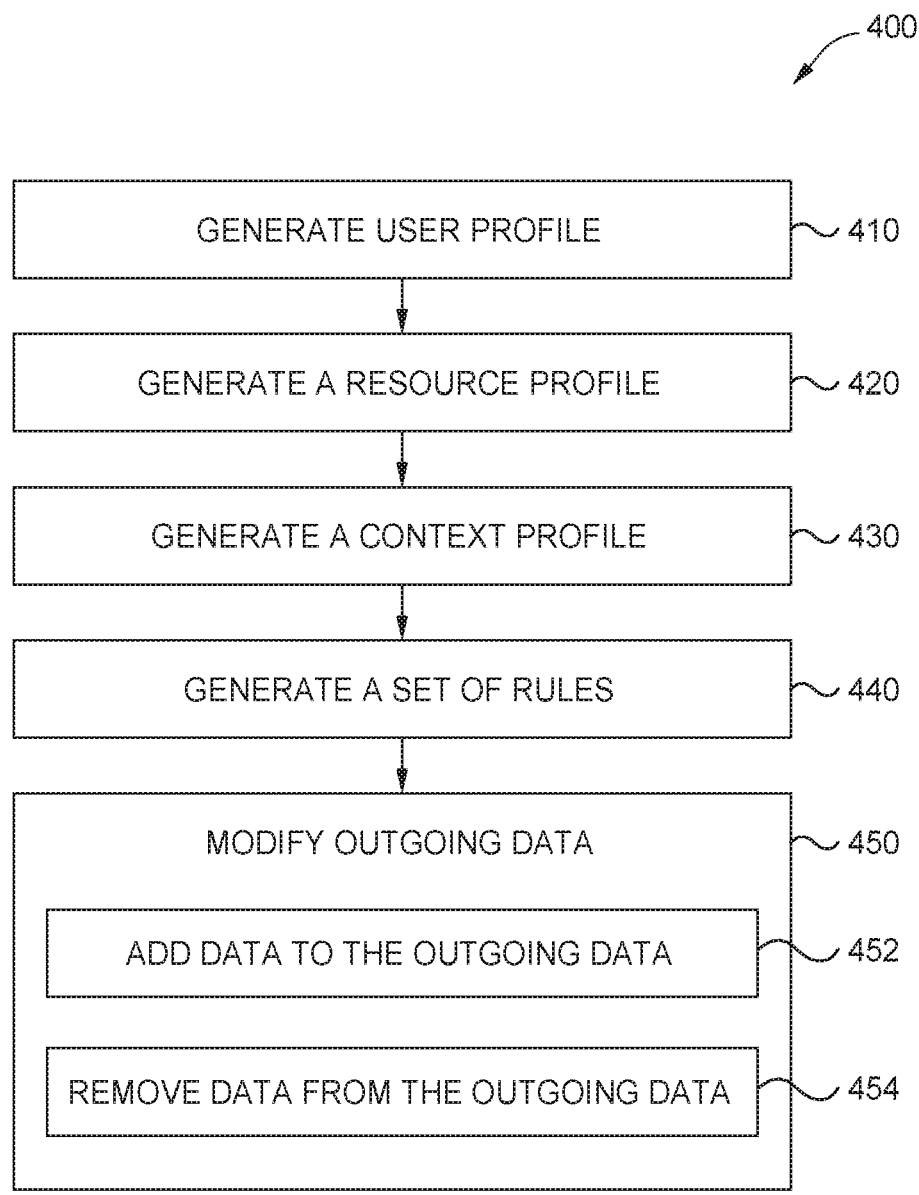
FIG. 4 is a flowchart of a method of modifying data being sent from an electronic device, according to one or more embodiments.

FIG. 4 is a flow chart of a method for regulating data transmitted to and from an electronic device (e.g., the electronic device 100 or 310). At operation 410, the user profile manager 112 of the advisor 110 generates the user profile 113. In one embodiment, the user profile manager 112 may receive instructions from the processor 120 to analyze data stored within the electronic device 100 to generate the user profile 113. For example, the user profile manager 112 may analyze data located on an electronic device (e.g., the electronic device 100 or 310) to identify data associated with a user. In various embodiments, the user profile manager 112 receives instructions from the processor 120 to analyze data being sent to the electronic device or from the electronic device to identify data associated with a user. For example, the user profile manager 112 may analyze messages (e.g., text message, or email messages, among others) being sent to the electronic device or from the electronic device. Further, the user profile manager 112 may analyze data being sent from one or more clients (e.g., the client 312) or to one or more clients to identify data associated with a user.

In one embodiment, the user profile manager 112 builds the user profile 113 based on data within one or more messages communicated to the electronic device 100 and/or from the electronic device 100. For example, the user profile manager 112 may analyze the messages to determine one or more attributes of a user (e.g., birthday, anniversary, relationships, etc.). In one or more embodiments, the user profile manager 112 builds a user profile 113 or augments data within a user profile 113 based on one or more answers provided by a user to one or more questions. For example, the user profile manager 112 may be configured to present one or more questions to a user, and build or augment the user profile 113 based on the provided answers. In one embodiment, the user profile manager 112 generates the questions based on information that is determined to be lacking from the data within the user profile 113. For example, the user profile manager 112 may present a question to the user asking for the user's birthday in response to a determination that the user's birthday is absent from the corresponding user profile (e.g., the user profile 113).

The user profile manager 112 may store the data as a user profile (e.g., the user profile 113) within the memory 140. For example, the user profile may be stored within a database of the memory 140.

At operation 420 the resource profile manager 114 of the advisor 110 generates the resource profile 115. In one embodiment, the resource profile manager 114 receives instructions from the processor 120 to acquire information associated within one or more resources. The resource may be a remote resource that is communicatively coupled to the electronic device (e.g., the electronic device 100 or 310) via a NIC (e.g., the NIC 130). In one embodiment, the resource profile manager 114 builds each resource profile and/or each resource type with which a user communicates. In various embodiments, to build each resource profile, the resource profile manager 114 may research the information available for a resource, running classification algorithms on a resource, analyzing the contents of a resource, or requesting data associated with a resource from a service, among others. In one embodiment, researching a resource may include researching a research to determine one or more of a categorization, location, owner, and hosting information, among others, for a resource. For example, the resource profile manager 114 may communicate with a monitoring service to determine a categorization of a resource. Further, the resource profile manager 114 may run one or more classification algorithms on one or more pages of a resource to determine the classification of the resource. In various embodiments, the resource profile manager 114 requests data associated with a resource from a web or internet search engine.

The resource profile manager 114 may store the data for each resource as a resource profile (e.g., the resource profile 115) within the memory 140. For example, the resource profile may be stored within a database of the memory 140.

At operation 430, the context profile manager 116 generates a context profile (e.g., the context profile 117). In one embodiment, the context profile manager 116 receives instructions from the processor 120 to build a context profile (e.g., the context profile 117). For example, the context profile manager 116 may receive instructions to generate a context profile for a newly added resource or for a new user preference. In one embodiment, the context profile manager 116 receives instructions from the processor 120 to build the context profile 117 automatically, without relying on explicit input provided by a user. For example, the context profile manager 116 may receive instructions to build a context profile by observing a user's interactions with one or more resources. For example, the context profile manager 116 may receive instructions to analyze data being sent by a user from an electronic device (e.g., the electronic device 100 or 310) to various resources. In various embodiments, the context profile manager 116 may track a user's preferences over a period of time when interacting with one or more resources or one or more categorizes of a resources. For example, the context profile manager 116 may track a user's interactions to determine a user's preferences for sharing various types of data with different categories of resources.

At operation 440, the rule manager 118 generates a set of rules (e.g., the rules 119). In one embodiment, the rule manager 118 receives instructions from the processor 120 to generate the set of rules. In one embodiment, the rule manager 118 utilizes a machine learning algorithm to generate the rules 119 from the user profile 113, the resource profile 115, and the context profile 117. For example, the rule manager 118 may utilize a data mining technique to generate the rules 119. In embodiment, the rule manager 118 may utilize a clustering algorithm to generate a set of rules (e.g., the rules 119) for a user. Alternatively, the rule manager 118 may utilize a neural network to generate a set of rules (e.g., the rules 119) for a user.

In one embodiment, rules are generated by comparing the user attributes of a user profile (e.g., the user profile 113), a resource profile (e.g., the resource profile 115), and a context profile (e.g., the context profile 117). In one embodiment, the data of the context profile 117 may be utilized to determine which attributes of a user profile 113 are shared with which resource or resource category. For example, a comparison of the context profile 117 with the user profile 113 and the resource profile 115 may indicate that a user shared information regarding the user's age with an e-commerce website. Accordingly, a rule may be created that allows the user's age to be shared with any website categorized as an e-commerce website.

At operation 450, the advisor 110 modifies the data being sent from an electronic device (e.g., the electronic device 100 or 310). For example, the advisor 110 may analyze the data being sent to and/or from an electronic device (e.g., the electronic device 100 or 310) and removes or adds data to the data being sent from an electronic device based on a set of rules (e.g., the rules 119). At operation 452, the advisor 110 adds one or more data packets to the data being sent from an electronic device (e.g., the electronic device 100 or 310) based on the rules 119. For example, the advisor 110 may determine the data that is being requested from a website, and based on an indication from the set of rules 119 as to whether or not the data can be shared with the website or the category of website, the advisor 110 adds a data packet corresponding to a requested data to the data be sent from an electronic device based on the set of rules 119. In one embodiment, the advisor 110 adds one or more data packets corresponding at least one of a user's birthday, employment association, social network membership, and payment preference, among others, to the data being sent from an electronic device based on the set of rules 119.

At operation 454, the advisor 110 removes one or more data packets from the data being sent from an electronic device (e.g., the electronic device 100 or 310) based on the set of rules 119. For example, the advisor 110 may determine the data that is being requested from a website, and based on an indication from the set of rules 119 as to whether or not the data can be shared with the website or the category of website. Further, based on the set of rules 119, the advisor 110 removes a data packet corresponding to the requested data from the data be sent from an electronic device based on the set of rules 119. In one embodiment, the advisor 110 removes one or more data packets corresponding at least one of a user's birthday, employment association, social network membership, and payment preference, among others, from the data being sent from an electronic device based on the set of rules 119.

Figure 5:
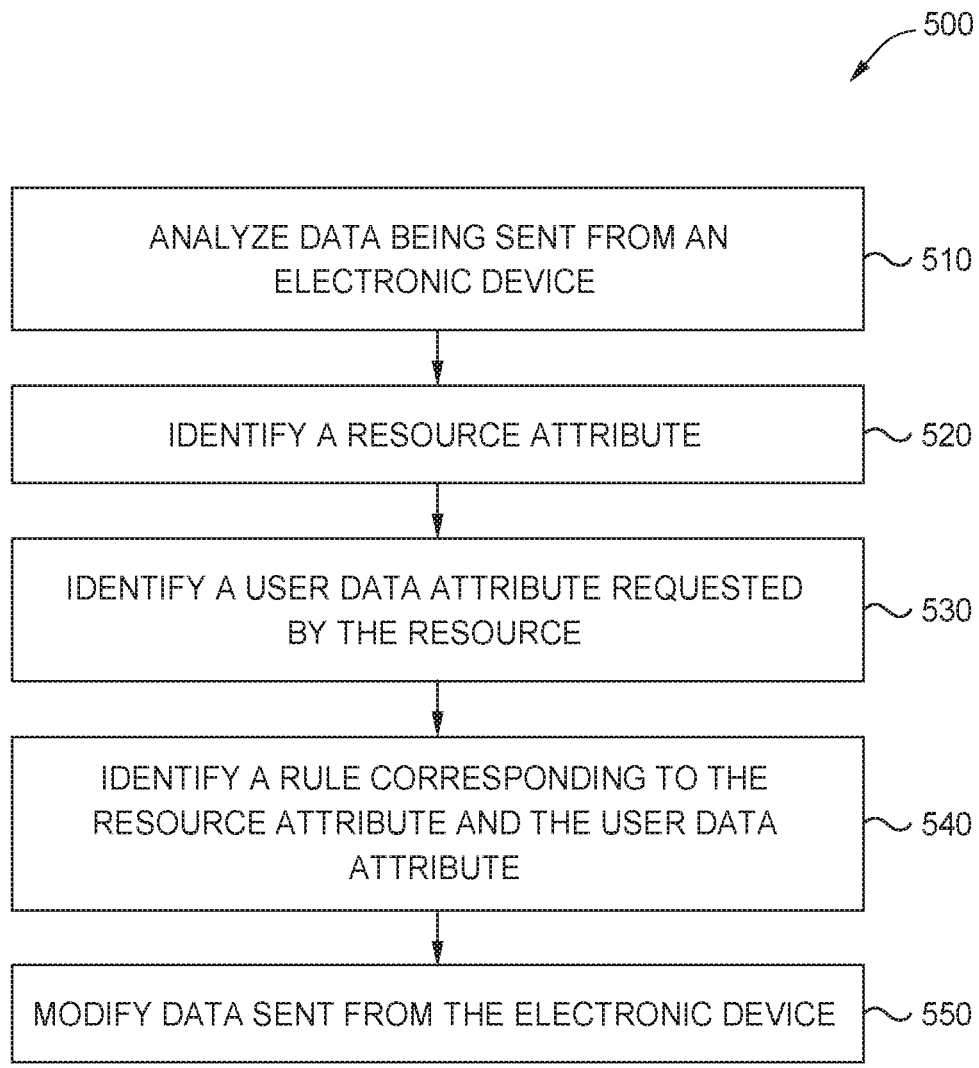
FIG. 5 is a flowchart of a method of identifying rules, according to one or more embodiments.

FIG. 5 is a flow chart of a method 500 for identifying rules utilized to regulate data transmitted between an electronic device (e.g., the electronic device 100 or 310) and a resource (e.g., the resource 330). At operation 510, the advisor 110 analyzes data being sent from an electronic device (e.g., the electronic device 100 or 310). For example, the advisor 110 may receive data from a client (e.g., the client 312) and analyzes the data. At operation 512, the advisor 110 identifies a resource attribute (e.g., a resource, category of resource, a location of a resource, and/or an owner of a resource, among others) from the data being sent from the electronic device. In one embodiment, the advisor 110 identifies that the category of a resource is an e-commerce resource category.

At operation 530, the advisor 110 identifies a data attribute being requested by the resource. For example, the advisor 110 may identify that the type of data associated with a user being requested by the resource. In one embodiment, the advisor 110 identifies that the type of data requested from an e-commerce cite corresponds to a user's membership in a social network.

At operation 540, the advisor 110 identifies one or more rules from a set of rules (e.g., the rules 119) associated with an identified resource and an identified type of requested data. For example, the advisor 110 identifies a first rule from the rules 119 based on the identified resource attribute and the identified data attribute. In one embodiment, the advisor 110 identifies a rule from the set of rules 119 based on the resource category "e-commerce" and the data type "user's membership in a social network." The identified rule indicates whether or not the data corresponding to the data type can be shared with the identified resource category.

At operation 550, the advisor 110 modifies the data sent from the electronic device (e.g., the electronic device 100 or 310) based on the identified rule. For example, the advisor 110 may remove one or more data packets from the data being sent from the electronic device based on the identified rule. In one embodiment, the identified rule may indicate that the data type "user's membership in a social network" is not to be shared with resources corresponding to the resource category "e-commerce." Accordingly, the advisor 110 may remove one or more data packets corresponding to a "user's membership in a social network" from the data being sent from the electronic device to an e-commerce website based on the identified rule.

In one or more embodiments, the advisor 110 may add one or more data packets to the data being sent from the electronic device based on the identified rule. In one embodiment, the identified rule may indicate that the data type "user's membership in a social network" is to be shared with resources corresponding to the resource category "e-commerce." Accordingly, the advisor 110 may add one or more data packets corresponding to a "user's membership in a social network" to the data being sent from the electronic device to an e-commerce website based on the identified rule.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for regulating a flow of data between an electronic device and a plurality of resources external to the electronic device, the method comprises:
   generating a user profile describing a user of the electronic device;
   generating a resource profile describing each of the plurality of resources;
   generating a context profile describing an outcome of one or more previous interactions between the user of the electronic device and one or more of the plurality of resources;
   generating a set of rules based on a comparison of the user profile, the resource profile, and the context profile, wherein each rule of the set of rules defines at least one of when and what type of data of the user profile is shared with each of the plurality of resources; and
   modifying outgoing data being sent to a first one of plurality of the resources from the electronic device based on the set of rules by:
      identifying user data and resource data within the outgoing data;
      identifying one or more rules of the set of rules according to the user data and the resource data; and
      modifying the outgoing data based on the one or more rules.

2. The method of claim 1 further comprising intercepting the outgoing data and modifying a data packet within the outgoing data based on the one or more rules.

3. The method of claim 2, wherein modifying the data packet comprising at least one of removing data associated with the user profile from the outgoing data and adding data associated with the user profile to the outgoing data based on the one or more rules.

4. The method of claim 1, wherein generating the user profile comprises analyzing data stored within the electronic device associated with the user.

5. The method of claim 1, wherein generating the resource profile comprises at least one of determining a category of each of the plurality of resources, an owner of each of the plurality of resources, and a location of each of the plurality of resources.

6. The method of claim 1, wherein generating the context profile comprises at least one of determining a type of data sent by the user to the one or more of the plurality of resources.

7. An electronic device, comprising:
   a memory storing instructions:
   a processor coupled to the memory a configured execute the instructions, the instructions when executed cause:
   a user profile manager of an advisor to generate a user profile associated with a user of the electronic device;
   a resource profile manager of the advisor to generate a resource profile associated with each of a plurality of resources external to the electronic device;
   a context profile manager of the advisor to generate a context profile associated with an outcome of one or more previous interactions between the user of the electronic device and one or more the plurality of resources;
   a rule manager of the advisor to generate a set of rules based on a comparison of the user profile, the resource profile and the context profile, wherein each rule of the set of rules defines at least one of when and what type of data of the user profile is shared with each of the plurality of resources; and
   the advisor to modify outgoing data sent to a first one of the plurality of resources from the electronic device based on the set of rules by:
      identifying user data and resource data within the outgoing data;
      identifying one or more rules of the set of rules according to the user data and the resource data; and
      modifying the outgoing data based on the one or more rules.

8. The electronic device of claim 7, wherein the processor is further causes the advisor to intercept the outgoing data and modify a data packet within the outgoing data based on the one or more rules.

9. The electronic device of claim 8, wherein modifying the data packet comprising at least one of removing data associated with the user profile from the outgoing data and adding data associated with the user profile to the outgoing data based on the one or more rules.

10. The electronic device of claim 7, wherein the user profile manager is configured to analyze data stored within the electronic device corresponding to the user to generate the user profile.

11. The electronic device of claim 7, wherein generating the resource profile comprises at least one of determining a category of a resource of the plurality of resources, an owner of the resource, and a location of the resource.

12. The electronic device of claim 7, wherein generating the context profile comprises at least one of determining a type of data sent by the user to the plurality of resources.

13. A computer program product for controller user data, the computer program product comprising:
- a computer-readable storage medium having computer-readable program code embodied therewith, the computer-readable program code executable by one or more computer processors to:
- generate a user profile associated with a user of an electronic device;
- generate a resource profile associated with a plurality of resources external to the electronic device;
- generate a context profile describing an outcome of one or more previous interactions between the user of the electronic device and one or more of the plurality of resources;
- generate a set of rules based on a comparison of the user profile, the resource profile, and the context profile, wherein each rule of the set of rules defines at least one of when and what type of data of the user profile is shared with each of the plurality of resources; and
- modify outgoing data being sent to a first one of the plurality of resources form the electronic device based on the set of rules by:
- identifying user data and resource data within the outgoing data;
- identifying one or more rules of the set of rules according to the user data and the resource data; and
- modifying the outgoing data based on the one or more rules.

14. The computer program product of claim 13, wherein the computer-readable program code is further executable to: intercept the outgoing data and modify a data packet within the outgoing data based on the one or more rules.

15. The computer program product of claim 14, wherein modifying the data packet comprising at least one of removing data associated with the user profile from the outgoing data and adding data associated with the user profile to the outgoing data based on the one or more rules.

16. The computer program product of claim 13, wherein generating the user profile comprises analyzing data stored within the electronic device corresponding to the user.

17. The computer program product of claim 13, wherein generating the resource profile comprises at least one of determining a category of a resource of the plurality of resources, an owner of the resource, and a location of the resource.

18. The computer program product of claim 13, wherein generating the context profile comprises at least one of determining a type of data sent by the user to a resource of the plurality of resources.

\* \* \* \* \*